United States Patent [19]

Machida et al.

[11] Patent Number: 5,584,778
[45] Date of Patent: Dec. 17, 1996

[54] TOROIDAL TYPE CONTINUOUSLY VARIABLE TRANSMISSION

[75] Inventors: Hisashi Machida; Hiroyuki Ito, both of Fujisawa, Japan

[73] Assignee: NSK Ltd., Tokyo, Japan

[21] Appl. No.: 636,750

[22] Filed: Apr. 19, 1996

Related U.S. Application Data

[63] Continuation of Ser. No. 189,747, Feb. 1, 1994, abandoned.

[30] Foreign Application Priority Data

| Feb. 2, 1993 | [JP] | Japan | 5-036183 |
| Feb. 3, 1993 | [JP] | Japan | 5-007295 U |
| Feb. 3, 1993 | [JP] | Japan | 5-007296 U |

[51] Int. Cl.⁶ .................................................. F16H 15/38
[52] U.S. Cl. ................................................. 476/46; 476/40
[58] Field of Search .................................. 476/40, 46, 41

[56] References Cited

U.S. PATENT DOCUMENTS

| 1,715,045 | 5/1929 | Richer | 476/40 |
| 2,060,884 | 11/1936 | Madle | 476/40 |
| 2,445,066 | 7/1948 | Hayes | 476/42 |
| 2,560,180 | 7/1951 | Lesueur | 476/40 |
| 2,850,911 | 9/1958 | Kraus | 476/42 |
| 3,087,348 | 4/1963 | Kraus | 476/41 |
| 3,581,587 | 6/1971 | Dickenbrock | 476/40 |
| 4,386,536 | 6/1983 | Kraus | 476/40 |
| 4,909,092 | 3/1990 | Machida et al. | 476/40 |
| 4,955,246 | 9/1990 | Nakano | 476/41 |
| 4,974,466 | 12/1990 | Kraus et al. | 476/40 |
| 5,007,298 | 4/1991 | Machida | 476/41 |
| 5,027,669 | 7/1991 | Nakano | 476/42 |
| 5,218,877 | 6/1993 | Fukushima et al. | 476/40 |
| 5,261,863 | 11/1993 | Jufuku et al. | 476/40 |
| 5,299,988 | 4/1994 | Fukushima et al. | 476/42 |
| 5,334,097 | 8/1994 | Tatara et al. | 476/40 |

FOREIGN PATENT DOCUMENTS

| 0389790 | 10/1990 | European Pat. Off. . |
| 0466113 | 1/1992 | European Pat. Off. . |
| 1217165 | 5/1966 | Germany . |
| 62-71465 | 5/1987 | Japan . |
| 62-184251 | 11/1987 | Japan . |
| 62-199557 | 12/1987 | Japan . |
| 401275951A | 11/1989 | Japan ................... 476/46 |
| 2032540 | 5/1980 | United Kingdom . |

OTHER PUBLICATIONS

Mark's Handbook for Mechanical Engineers, 8th Edition, 1979, pp. 8–136 to 8–137.

Primary Examiner—Allan D. Herrmann
Assistant Examiner—Troy Grabow
Attorney, Agent, or Firm—Shapiro and Shapiro

[57] ABSTRACT

The total of thrust loads acting on first, second, and third angular ball bearings upon operation of a transmission is reduced. In order to reduce torque losses of the angular ball bearings, a toroidal type continuously variable transmission is arranged so that a thrust load based on the counterforce upon operation of a compression device is received by the third angular ball bearing, and the difference between a thrust load acting on an input-side disk and a thrust load acting on an output-side disk acts on an output shaft. A thrust load corresponding the difference is received by one of the first and second angular ball bearings.

8 Claims, 13 Drawing Sheets

TOROIDAL TYPE CONTINUOUSLY VARIABLE TRANSMISSION

This is a continuation of application Ser. No. 08/189,747 filed Feb. 1, 1994, now abandoned.

BACKGROUND OF THE INVENTION

1. Field of the Invention

The present invention relates to a toroidal type continuously variable transmission which is used as, e.g., a transmission for a vehicle.

2. Related Background Art

The use, as a transmission for a vehicle, of a toroidal type continuously variable transmission shown in FIGS. 13 and 14 has been studied. In this toroidal type continuously variable transmission, as disclosed in, e.g., Japanese Laid-Open Utility Model Application No. 62-71465, an input-side disk 2 is supported to be concentrical with an input shaft 1 as an input member, and an output-side disk 4 is fixed to the end portion of an output shaft 3 as an output member. Trunnions 6 are swingable about pivot shafts 5 located at twisted positions with respect to the input shaft 1 and the output shaft 3, and are arranged on the inner surface of a casing which stores the toroidal type continuously variable transmission, or on a support bracket provided in the casing.

The pivot shafts 5 are provided to the outer surfaces of the two end portions of each trunnion 6. The proximal end portion of each displacement shaft 7 is supported by the central portion of a trunnion 6. When each trunnion 6 is swung about the pivot shafts 5, the inclination angle of each displacement shaft 7 can be freely adjusted. The displacement shaft 7 supported by each trunnion 6 rotatably supports a power roller 8. The power rollers 8 are clamped between the two, i.e., input- and output-side disks 2 and 4.

Opposing inner surfaces 2a and 4a of the input- and output-side disks 2 and 4 have arcuate recessed surface sections having the pivot shafts 5 as the centers. Circumferential surfaces 8a of the power rollers 8 which are formed to have spherical projecting surface sections are respectively in contact with the inner surfaces 2a and 4a.

A loading cam type compression device 9 is provided between the input shaft 1 and the input-side disk 2, and elastically presses the input-side disk 2 toward the output-side disk 4. The compression device 9 is constituted by a cam disk 10 which rotates together with the input shaft 1, and a plurality of (e.g., four) rollers 12 held by a holder 11. A cam surface 13 as a recessed/projecting surface extending across the circumferential direction is formed on one surface (the left surface in FIGS. 13 and 14) of the cam disk 10, and a similar cam surface 14 is formed on the outer surface (the right surface in FIGS. 13 and 14) of the input-side disk 2. The plurality of rollers 12 are rotatably supported to have, as the center, an axis in the radial direction with respect to the center of the input shaft 1.

In a use of the toroidal type continuously variable transmission with the above-mentioned structure, when the cam disk 10 is rotated upon rotation of the input shaft 1, the plurality of rollers 12 are pressed against the cam surface 14 formed on the outer surface of the input-side disk 2 by the cam surface 13. As a result, the input-side disk 2 is pressed against the plurality of power rollers 8, and at the same time, the input-side disk 2 is rotated upon meshing between the pair of cam surfaces 13 and 14 and the plurality of rollers 12. The rotation of the input-side disk 2 is transmitted to the output-side disk 4 via the plurality of power rollers 8, and the output shaft 3 fixed to the output-side disk 4 is rotated.

When the rotational speeds of the input and output shafts 1 and 3 are to be changed, e.g., when a deceleration is to be performed between the input and output shafts 1 and 3, the trunnions 6 are swung about the pivot shafts 5 to incline the displacement shafts 7, so that the circumferential surfaces 8a of the power rollers 8 contact portions, near the center, of the inner surface 2a of the input-side disk 2 and portions, near the outer periphery, of the inner surface 4a of the output-side disk 4, as shown in FIG. 13.

On the contrary, when an acceleration is to be performed, the trunnions 6 are swung to incline the displacement shafts 7, so that the circumferential surfaces 8a of the power rollers 8 contact portions, near the outer periphery, of the inner surface 2a of the input-side disk 2 and portions, near the center, of the inner surface 4a of the output-side disk 4, as shown in FIG. 14. When the inclination angle of the displacement shafts 7 is set to be an intermediate angle between FIGS. 13 and 14, an intermediate transmission ratio can be obtained between the input and output shafts 1 and 3.

FIG. 15 shows a toroidal type continuously variable transmission described in the microfiche film of Japanese Utility Model Application No. 61-87523 (Japanese Laid-Open Utility Model Application No. 62-199557), and shows a structure applied to a transmission for a vehicle. The rotation of a crankshaft of an engine is transmitted to an input shaft 16 via a clutch 15, thereby rotating the cam disk 10, which is spline-engaged with the middle portion of the input shaft 16. Upon operation of the compression device 9 including this cam disk 10, the input-side disk 2 is rotated while being pressed toward the output-side disk 4 (leftward in FIG. 15). The rotation of the input-side disk 2 is transmitted to the output-side disk 4 via the power rollers 8.

The output-side disk 4 is supported by a needle bearing 17 at a portion around the input shaft 16, and a cylindrical output shaft 29 formed integrally with the output-side disk 4 is supported by an angular type ball bearing 19 at the inner side of a housing 18. On the other hand, one end (the right end in FIG. 15) of the input shaft 16 is rotatably supported by a rolling bearing 20 at the inner side of the housing 18, and the other end thereof is rotatably supported by an angular type ball bearing 21 at the inner side of the housing 18.

A transmission gear 24 obtained by integrating a driving forward gear 22 and a driving backward gear 23 is spline-engaged with the outer circumferential surface of the output shaft 29. When a vehicle is to be driven forward, the transmission gear 24 is moved to the right to cause the drive-side forward gear 22 to directly mesh with a driven forward gear 26 provided at the middle portion of a pickup shaft 25; when a vehicle is to be driven backward, the transmission gear 24 is moved to the left to cause the driving backward gear 23 to mesh with a driven backward gear 27 fixed to the middle portion of the pickup shaft 25 via an intermediate gear (not shown).

In a use of the toroidal type continuously variable transmission with the above-mentioned structure, when the input shaft 16 is rotated by the engine via the clutch 15, and the transmission gear 24 is moved in a proper direction, the pickup shaft 25 can be rotated in an arbitrary direction. When the trunnions 6 are swung to change the contact positions between the circumferential surfaces 8a of the power rollers 8 and the inner surfaces 2a and 4a of the input- and output-side disks 2 and 4, the rotational speed ratio between the input shaft 16 and the pickup shaft 25 can be changed.

When the above-mentioned toroidal type continuously variable transmission is driven, the input-side disk 2 is pressed toward the output-side disk 4 upon operation of the compression device 9. As a result, a thrust load in the right direction in FIG. 15 acts, as a counterforce based on the pressing force, on the input shaft 16, which supports the cam disk 10 of the compression device 9. This thrust load is received by the ball bearing 21 via a nut 28 threadably engaged with the end portion of the input shaft 16. Also, a thrust load in the left direction in FIG. 15 acts on the output shaft 29 via the input- and output-side disks 2 and 4 and the power rollers 8 upon operation of the compression device 9. This thrust load is received by the ball bearing 19.

Note that FIG. 15 also illustrates an engine brake clutch 30 and a direct coupling clutch 31. However, since the structures and operations of these clutches are well known, a detailed description thereof will be omitted.

In the above-mentioned conventional structure shown in FIG. 15, the thrust loads in the opposing directions, which are generated upon operation of the compression device 9 in a driving state of the transmission, are independently received by the two ball bearings 19 and 21. Therefore, torque losses at portions of the ball bearings 19 and 21 based on the thrust loads are generated independently from each other.

The thrust loads are considerably large, and hence, the torque losses at the portions of the ball bearings 19 and 21 are also considerably large. Therefore, when the torque losses are independently generated at two positions, a loss of the toroidal type continuously variable transmission as a whole becomes considerably large, resulting in poor efficiency of the overall toroidal type continuously variable transmission.

Furthermore, in the conventional structure shown in FIG. 15, the thrust load transmitted from the output-side disk 4 to the output shaft 29 is transmitted to an inner ring 19a of the ball bearing 19 via a stop ring 133. Therefore, the stop ring 133 receives a considerably large thrust load upon operation of the toroidal type continuously variable transmission. However, it is difficult to assure high reliability and durability of the stop ring 133, and a demand has arisen for improving the structure.

Moreover, in the conventional structure shown in FIG. 15, when the cam disk 10 is pressed rightward upon operation of the compression device 9, and the rightward thrust load acts on the input shaft 16, the input shaft 16 is displaced to the right while compressing a coned disk spring 134 between a sleeve 130 and the nut 28. In this case, the outer surface of the distal end portion of the input shaft 16 is in sliding frictional contact with the inner surface of the sleeve 130. In the conventional structure, due to the sliding frictional contact between these two surfaces, a frictional force generated between the two surfaces becomes large, and a power loss inside the toroidal type continuously variable transmission increases accordingly.

SUMMARY OF THE INVENTION

It is an object of the present invention to provide a toroidal type continuously variable transmission which improves efficiency by suppressing torque losses caused by thrust loads generated in an operation.

It is another object of the present invention to provide a toroidal type continuously variable transmission which improves durability and reliability by improving the mechanical strength of a portion for receiving a thrust load acting on an output disk.

It is still another object of the present invention to provide a toroidal type continuously variable transmission which eliminates an internal power loss and improves transmission efficiency by eliminating a friction generated upon operation of a compression device.

A toroidal type continuously variable transmission according to a first aspect the present invention comprises, as in the conventional toroidal type continuously variable transmission described above, an input member, an input-side disk arranged concentrically with the input member, and rotated upon rotation of the input member, an output-side disk arranged concentrically with the input-side disk, and supported to be rotatable with respect to the input-side disk, an output member arranged concentrically with the output-side disk, and rotated upon rotation of the output-side disk, a compression device for pressing one of the input- and output-side disks toward the other disk in an operation of the transmission, trunnions which are swung about pivot shafts located at twisted positions with respect to the central axis of the input- and output-side disks, and power rollers clamped between the input- and output-side disks while being rotatably supported by the trunnions. The opposing inner surfaces of the input- and output-side disks are formed to have an arcuate recessed surface section, the circumferential surfaces of the power rollers are formed to have a spherical projecting surface section, and the circumferential surfaces and the inner surface contact with each other, thereby constituting the toroidal type continuously variable transmission.

In addition, the toroidal type continuously variable transmission according to the first aspect of the present invention comprises a single rolling bearing, which is arranged between one of the input and output members and the input-side disk, allows a relative rotation between the input-side disk and the one member, and is capable of receiving a load in a thrust direction acting on the input-side disk upon operation of the compression device, and a duplex rolling bearing, which is arranged between the one member and a stationary portion, allows rotation of the one member with respect to the stationary portion, and is capable of receiving thrust loads in two directions acting on the one member.

Furthermore, in the toroidal type continuously variable transmission according to a variation of the first aspect of the present invention, the single rolling bearing is arranged between the one member and the output-side disk in place of the position between the one member and the input-side disk to allow a relative rotation between the output-side disk and the one member, and to be capable of receiving a load in a thrust direction acting on the output-side disk upon operation of the compression device.

An operation performed when the toroidal type continuously variable transmission according to the present invention with the above-mentioned structure changes the rotational speed ratio between the input and output members is the same as that of the above-mentioned conventional structure.

In the toroidal type continuously variable transmission of the present invention as described above, the single rolling bearing receives the load in the thrust direction acting on the input- or output-side disk upon operation of the compression device, and the duplex rolling bearing receives the thrust load acting on the one member. The thrust load acting on the one member is generated on the basis of the difference between a thrust load acting on the input-side disk, and a thrust load acting on the output-side disk, and is smaller than the loads themselves acting on the input- and output-side disks.

Therefore, torque losses at the portions of the rolling bearings are small, and the efficiency of the toroidal type continuously variable transmission can be improved due to a small torque loss of the toroidal type continuously variable transmission as a whole.

A toroidal type continuously variable transmission according to a second aspect of the present invention comprises input and output shafts which are arranged concentrically with each other and are independently rotatable, an input-side disk arranged concentrically with the input shaft, and rotated upon rotation of the input shaft, an output-side disk supported around the output shaft not to be rotatable with respect to the output shaft, an output gear arranged independently from the output-side disk, and supported around the output shaft not to be rotatable with respect to the output shaft, a compression device for pressing one of the input- and output-side disks toward the other disk upon operation of the transmission, a rolling bearing arranged between the output shaft and a stationary portion, and receiving a thrust load acting from the output-side disk to the output shaft upon operation of the compression device, trunnions which are swung about pivot shafts located at twisted positions with respect to the central axis of the input- and output-side disks, and power rollers clamped between the input- and output-side rollers while being rotatably supported by the trunnions.

A boss portion formed on an inner circumferential portion of the output gear is clamped between a collar portion integrally formed on the outer circumferential surface of a middle portion of the output shaft and a portion, near the inner periphery, of the outer surface of the output-side disk. The opposing inner surfaces of the input- and output-side disks are formed to have an arcuate recessed surface section, the circumferential surfaces of the power rollers are formed to have a spherical projecting surface section, and the circumferential surfaces and the inner surface contact with each other.

An operation performed when the toroidal type continuously variable transmission according to the present invention with the above-mentioned structure changes the rotational speed ratio between the input and output shafts is the same as that of the above-mentioned conventional structure.

In the toroidal type continuously variable transmission according to the present invention as just described, a thrust load acting on the output-side disk upon operation of the transmission is transmitted to the output shaft via the boss portion and the collar portion of the output gear. The collar portion has a sufficient rigidity and durability and is not damaged by the thrust load since it is formed integrally with the output shaft.

A toroidal type continuously variable transmission according to a third aspect of the present invention comprises an input member, an input-side disk arranged concentrically with the input member, and rotated upon rotation of the input member, an output-side disk arranged concentrically with the input-side disk, and rotatably supported to oppose the input-side disk, an output member arranged concentrically with the output-side disk, and rotated upon rotation of the output-side disk, a compression device for pressing one of the input- and output-side disks toward the other disk upon operation of the transmission, a first rolling bearing which has an outer ring coupled and fixed to the inner peripheral edge of a cam disk of the compression device, and receives a thrust load acting on the cam disk upon operation of the compression device, a second rolling bearing which is arranged between the inner surface of an inner ring of the first rolling bearing and the outer surface of one of the input and output members, which one member is rotated together with the other disk, and is displaceable in a thrust direction, trunnions which are swung about pivot shafts located at twisted positions with respect to the central axis of the input- and output-side disks, and power rollers clamped between the input- and output-side rollers while being rotatably supported by the trunnions. The opposing inner surfaces of the input- and output-side disks are formed to have an arcuate recessed surface section, the circumferential surfaces of the power rollers are formed to have a spherical projecting surface section, and the circumferential surfaces and the inner surface contact with each other.

An operation performed when the toroidal type continuously variable transmission according to the present invention with the above-mentioned structure changes the rotational speed ratio between the input and output shafts is the same as that of the above-mentioned conventional structure.

In the toroidal type continuously variable transmission according to the present invention as just described, when the cam disk and one of the input and output members are displaced in the axial direction upon operation of the compression device, a needle bearing contacting the outer surface of the one member is displaced while being rotated around the one member.

The locus of the needle member on the outer surface of the one member upon displacement of the one member in the axial direction defines a spiral pattern. Therefore, the frictional state between the needle bearing and the outer surface becomes closer to a rolling frictional state than to a sliding frictional state. As a result, a frictional loss caused upon displacement of the one member and the cam disk can be eliminated.

DESCRIPTION OF THE PREFERRED EMBODIMENTS

Figure 1:
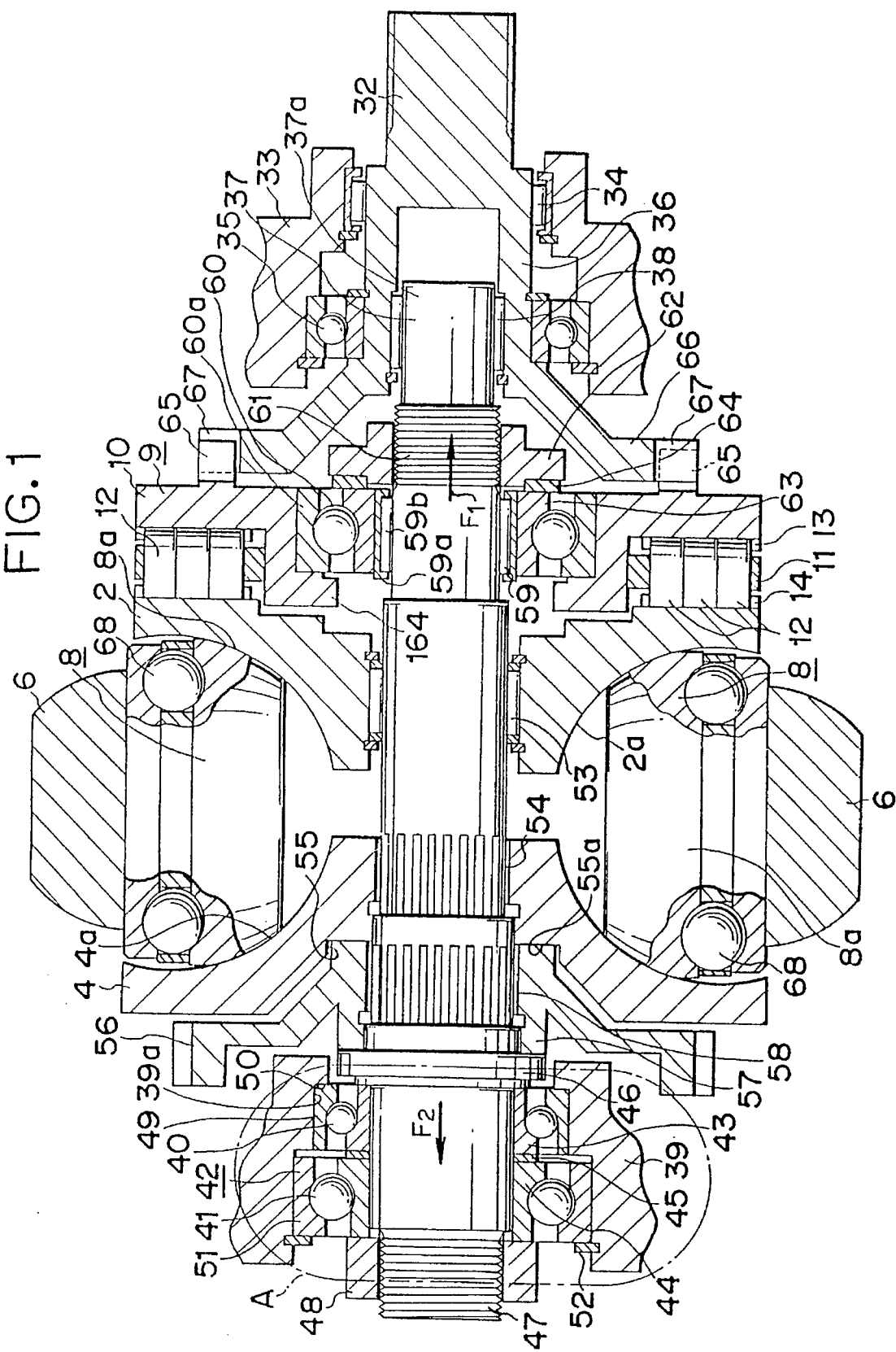
FIG. 1 is a sectional view showing the first embodiment of the present invention.

FIG. 1 shows the first embodiment of the present invention. An input shaft 32 as an input member has a proximal end portion (the right end portion in FIG. 1) connected to a crankshaft of an engine (not shown), and is driven by the crankshaft. The input shaft 32 is rotatably supported by a needle bearing 34 and a deep-grooved type ball bearing 35 at the inner side of a first support portion 33 provided in a housing. A cylindrical portion 36 open to the distal end side (the left side in FIG. 1) is formed in the middle portion of the input shaft 32.

A proximal end portion 37a of an output shaft 37 as an output member is inserted in the cylindrical portion 36. A needle bearing 38 is arranged between the outer circumferential surface of the proximal end portion 37a and the inner circumferential surface of the cylindrical portion 36. The distal end portion of the output shaft 37 is rotatably supported by first and second angular ball bearings 40 and 41, which are fitted to each other by so-called face-to-face fitting having opposing contact angles, at the inner side of a second support portion 39 provided in the housing. These first and second angular ball bearings 40 and 41 constitute a duplex rolling roller bearing 42, which supports the output shaft 37 as one member on the second support portion 39 as a stationary portion to be rotatable and to be able to receive thrust loads in two directions.

More specifically, inner rings 43 and 44 of the first and second angular ball bearings 40 and 41 abut against each other via a spacer 45, and the inner rings 43 and 44 and the spacer 45 are clamped and fixed between one surface (the left surface in FIG. 1) of a collar portion 46 formed on the outer circumferential surface of the output shaft 37, and a nut 48 threadably engaged with a male screw portion 47 at the distal end portion of the output shaft 37. The end face (the right end face in FIG. 1) of an outer ring 49 of the first angular ball bearing 40 abuts against a stepped portion 50 formed on an inner circumferential surface 39a of the second support portion 39, and the end face (the left end face in FIG. 1) of an outer ring 51 of the second angular ball bearing 41 is pressed by a stop ring 52 fixed to the inner circumferential surface 39a. As a result, the output shaft 37 is supported inside the housing to be concentrical with the input shaft 32 and to be rotatable independently from the input shaft 32. The first and second angular ball bearings 40 and 41 need not be preloaded upon assembling.

Input- and output-side disks 2 and 4 are supported on the middle portion of the output shaft 37, so that their inner surfaces 2a and 4a oppose each other. A needle bearing 53 is arranged between the inner circumferential surface of the input-side disk 2 and the outer circumferential surface of the output shaft 37 to allow a relative rotation between the output shaft 37 and the input-side disk 2.

A first spline engaging portion 54 is provided between the outer circumferential surface of the output shaft 37 and the inner circumferential surface of the output-side disk 4 to disable a relative rotation between the output shaft 37 and the output-side disk 4. Furthermore, the outer circumferential surface of the output shaft 37 and the inner circumferential surface of the output-side disk 4 are fitted to each other at a portion falling outside the first spline engaging portion 54. Therefore, cluttering of the output-side disk 4 with respect to the output shaft 37 can be prevented.

In the illustrated embodiment, a recessed portion 55 is formed on a portion, near the center in the radial direction, of the outer surface of the output-side disk 4. A recessed surface 55a of the recessed portion 55 and the other surface (the right surface in FIG. 1) of the collar portion 46 clamp a boss portion 57 of an output gear 56 therebetween. Therefore, the output gear 56, a portion of the boss portion 57, and a portion of the output-side disk 4 overlap each other in the radial direction of the respective members. As a result, the axial sizes of these members 4, 56, and 57 can be reduced, thus achieving a compact, light-weight toroidal type continuously variable transmission.

A second spline engaging portion 58 is provided between the boss portion 57 and the outer circumferential surface of the output shaft 37. Therefore, the output-side disk 4 and the output gear 56 are synchronously rotated via the output shaft 37. Also, the outer circumferential surface of the output shaft 37 and the inner circumferential surface of the boss portion 57 are fitted to each other at a portion falling outside the second spline engaging portion 58. Therefore, cluttering of the output gear 56 with respect to the output shaft 37 can be prevented.

The output-side disk 4 and the output gear 56 are rotated in synchronism with the output shaft 37.

A plurality of trunnions 6 are swingably arranged between the input- and output-side disks 2 and 4, and rotatably support power rollers 8. Thrust bearings 68 are arranged between the trunnions 6 and the power rollers 8 to be able to receive thrust loads acting on the power rollers 8 upon operation of the toroidal type continuously variable transmission.

A cam disk 10 of a compression device 9 is supported at the middle portion, near the proximal end, of the output shaft 37 by a needle bearing 59 and a third angular ball bearing 60 as a single rolling bearing to be rotatable with respect to the output shaft 37. A flange nut 62 is threadably fixed to a male screw portion 61 formed on the middle portion, nearer the proximal end than the needle bearing 59, of the output shaft 37. A coned disk spring 64 is arranged between the flange nut 62 and the end face of an inner ring 63 constituting the third angular ball bearing 60. Upon operation of the compression device 9, the cam disk 10 moves to the right in FIG. 1 while compressing the coned disk spring 64.

An outer ring 60a of the third angular ball bearing 60 is fitted in and fixed to a holding portion 164 formed on the inner peripheral edge portion of the cam disk 10 and having a short cylindrical shape and an L-shaped section. A raceway 59a of the needle bearing 59 is fitted in and fixed to the inner circumferential surface of the inner ring 63 of the third angular bearing 60. A plurality of needles 59b of the needle bearing 59 is clamped between the inner circumferential surface of the raceway 59a and the outer circumferential surface of the output shaft 37 to allow rolling movement. Therefore, the needle bearing 59 is displaceable in the thrust direction.

The flange nut 62 is threadably fixed to the male screw portion 61 formed on the middle portion, nearer the proximal end than the needle bearing 59, of the output shaft 37. The coned disk spring 64 is arranged between the flange nut 62 and the end face of the inner ring 63. Therefore, the cam disk 10 is elastically pressed toward a cam surface 14 formed on the outer surface of the input-side disk 2 by the elastic force of the coned disk spring 64. A plurality of rollers 12 which are rotatably held by a holder 11 are arranged between the cam surface 14 and a cam surface 13 on the surface of the cam disk 10, so as to rotate the input-side disk 2 while pressing it against the output-side disk 4 upon rotation of the cam disk 10.

A plurality of projections 65 are intermittently fixed at equal angular intervals at radially intermediate positions on the outer surface (the surface opposite to the cam surface 13) of the cam disk 10 on a single arc having the central axis of the cam disk 10 as the center. On the other hand, the outer peripheral edge of a ring portion 66 formed at the distal end portion of the input shaft 32 is formed into a gear shape, and a plurality of projections 67 are intermittently fixed at equal interval on the outer peripheral edge. These projections 67 and the projections 65 on the outer surface of the cam disk 10 are meshed with each other. Therefore, the cam disk 10 is rotated upon rotation of the input shaft 32.

The operation of the toroidal type continuously variable transmission according to the present invention with the above-mentioned structure is as follows. When the input shaft 32 is rotated to rotate the input-side disk 2 via the cam disk 10 and the rollers 12, the power rollers 8 contacting the inner surface 2a of the input-side disk 2 are rotated, and the rotation of the rollers 8 is transmitted to the output-side disk 4.

Upon operation of the compression device 9, i.e., when the cam surface 13 of the cam disk 10 presses the rollers 12 against the cam surface 14 of the input-side disk 2, the cam disk 10 is displaced to the right in FIG. 1 against the elastic force of the coned disk spring 64 by a thrust load $F_1$ generated in the cam disk 10 on the basis of the reaction force acting on the cam disk 10. In this state, the cam disk 10 and the output shaft 37 are rotated relative to each other. Therefore, the needles 59b of the needle bearing 59 allow the displacement of the cam disk 10 while being spirally moved along the outer circumferential surface of the output shaft 37.

Therefore, a frictional state generated when the cam disk 10 is displaced upon operation of the compression device 9 becomes closer to a rolling frictional state than a sliding frictional state, and a frictional loss upon displacement of the cam disk 10 can be reduced.

The rotation of the output-side disk 4 is transmitted to the output shaft 37 via the first spline engaging portion 54, and is further transmitted to the output gear 56 via the second spline engaging portion 58, thus rotating the output gear 56. The rotation of the output gear 56 is transmitted to a drive shaft via a gear assembly (not shown), thereby driving a vehicle. A structure for switching between forward and backward movements of a vehicle is assembled in the gear assembly.

In order to change the rotational speed ratio between the input and output shafts 32 and 37, the trunnions 6 are swung to change the contact positions between the circumferential surfaces 8a of the power rollers 8 and the inner surfaces 2a and 4a of the input- and output-side disks 2 and 4.

When the two disks 2 and 4, and the power rollers 8 contact with each other under pressure in an operation, the inner surfaces 2a and 4a receive the same pressing forces (not shown) for pressing the inner surfaces outwardly in a direction perpendicular to the contact surfaces from the power rollers 8. Of these pressing forces, if a component for pressing the input-side disk 2 in the axial direction is represented by a thrust load $F_1$, and a component for pressing the output-side disk 4 in the axial direction is represented by a thrust load $F_2$, $F_1=F_2$ is satisfied when the power rollers 8 are rotated about axes perpendicular to the axes of the disks. On the other hand, as the inclination angle of the power rollers 8 increases, $F_1 \neq F_2$, since the axial component of one pressing force increases, and that of the other pressing force decreases.

In the toroidal type continuously variable transmission of the present invention, when the input shaft 32 is rotated, the third angular ball bearing 60 as the single rolling bearing receives the thrust load $F_1$ which acts on the cam disk 10 as a counterforce of a force for pressing the input-side disk 2 upon operation of the compression device 9. The thrust load $F_1$ is transmitted to the output shaft 37 via the inner ring 63 and the coned disk spring 64, and as a result, the thrust load $F_1$ acts on the output shaft 37 to the right in FIG. 1.

On the other hand, a force acting on the input-side disk 2 on the basis of the compression device 9 is transmitted to the output-side disk 4 via the power rollers 8, and the thrust load $F_2$ in a direction opposite to that acting on the input-side disk 2 acts on the output-side disk 4. Furthermore, this thrust load $F_2$ is transmitted to the output shaft 37 via the boss portion 57 and the collar portion 46 of the output gear 56. As a result, the thrust load $F_2$ acts on the output shaft 37 in a direction opposite to the thrust load $F_1$. Therefore, a thrust load corresponding to the difference ($|F_1-F_2|$) between the two thrust loads $F_1$ and $F_2$ acts on the output shaft 37 in a direction corresponding to a larger thrust load of the two.

The thrust load $F_2$ generated in a use of the toroidal type continuously variable transmission is considerably large. However, the collar portion 46 for transmitting this thrust load $F_1$ from the boss portion 57 to the output shaft 37 has a sufficient mechanical strength since it is integrally formed on the output shaft 37. Therefore, reliability and durability of a portion for transmitting the thrust load $F_2$ can be sufficiently assured.

For example, the thrust load $F_2$ acting from the output-side disk 4 to the output shaft 37 equals the thrust load $F_1$ ($F_1=F_2$) when the input- and output-side disks rotate at equal speed. Therefore, in this case, the two thrust loads $F_1$ and $F_2$ cancel each other, and this state is equivalent to a state wherein no thrust load acts on the output shaft 37. In this state, no thrust load acts on the first and second angular ball bearings 40 and 41, and a torque loss caused by these two angular ball bearings 40 and 41 becomes very small.

Figure 15:
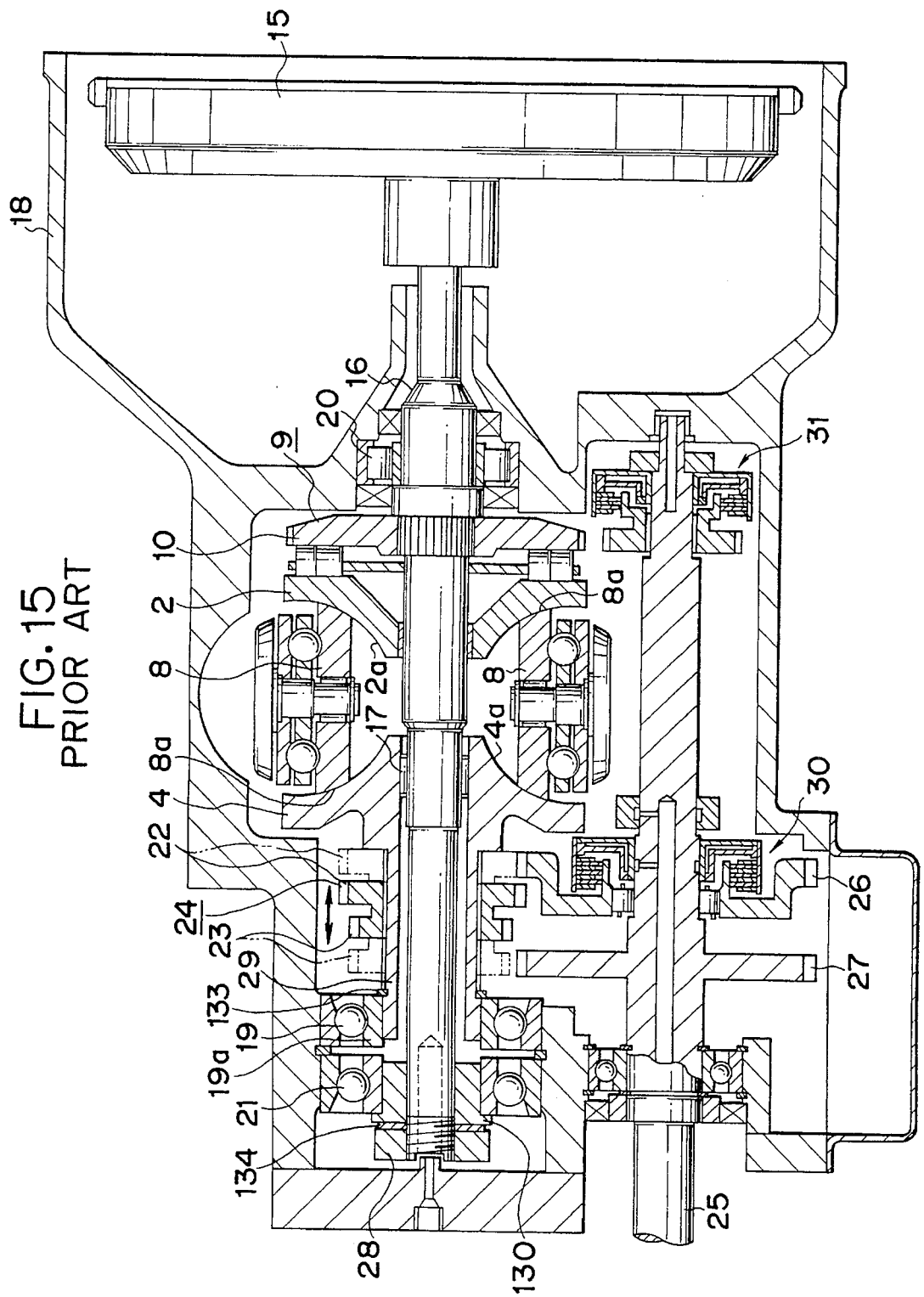
FIG. 15 is a sectional view showing an example of a conventional detailed structure.

On the other hand, the thrust load $F_1$ always acts on the third angular ball bearing 60. Therefore, the total of thrust loads acting on the first to third angular ball bearings 40, 41, and 60, which are arranged to receive a thrust load generated upon operation of the toroidal type continuously variable transmission is only $F_1$. In contrast to this, in the conventional structure shown in FIG. 15, the total of thrust loads is $2F_1$.

In this manner, in the toroidal type continuously variable transmission according to the present invention, the total of torque losses caused by all the angular ball bearings 40, 41, and 60 can be greatly reduced as compared to the conventional structure. When the toroidal type continuously variable transmission is used as a transmission for a vehicle, the input- and output-side disks 2 and 4 are normally rotated at almost equal rotational speeds, and in this case, since $F_1 \approx F_2$ is satisfied, as described above, the torque loss elimination effect is significant.

Figure 13:
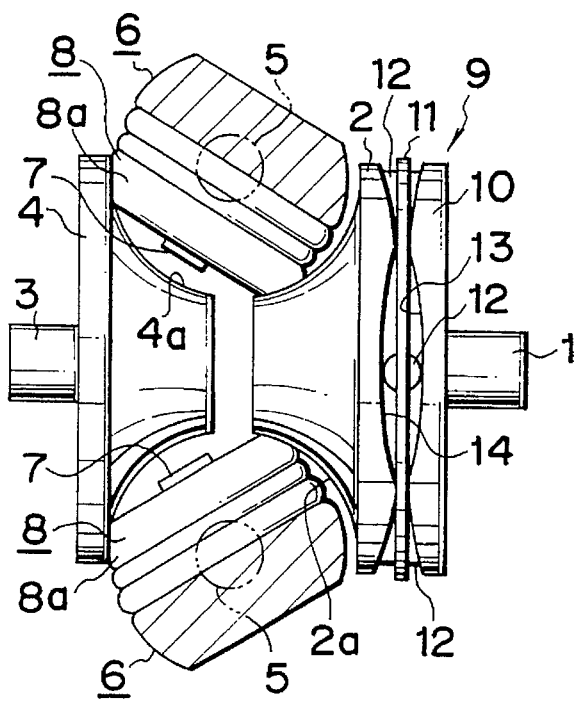
FIG. 13 is a side view showing the basic arrangement of a conventional toroidal type continuously variable transmission in a maximum deceleration state.

When the power rollers 8 are inclined, as shown in FIG. 13, to perform a deceleration between the input- and output-side disks 2 and 4, the thrust load $F_2$ acting from the output-side disk 4 to the output shaft 37 becomes larger than the thrust load $F_1$ based on the counterforce acting on the cam disk 10 ($F_2>F_1$). In this state, a thrust load $F_2-F_1$ acts on the output shaft 37 to the left in FIG. 1. The thrust load $F_2-F_1$ is received by the larger, second angular ball bearing 41 of the first and second angular ball bearings 40 and 41, which constitute the duplex ball bearing 42. A thrust load acting on the stop ring 52 which stops the outer ring of the second angular ball bearing 41 is $F_2-F_1$, as described above, and is smaller than $F_2$, thus assuring sufficient reliability and durability.

In the deceleration state, the total of thrust loads acting on the first to third angular ball bearings 40, 41, and 60 is only $F_1+(F_1-F_2)=F_2$. In contrast to this, in the conventional structure shown in FIG. 15, the total of thrust loads becomes $F_1+F_2$. Therefore, in the deceleration state as well, the toroidal type continuously variable transmission of the present invention can reduce the torque loss as compared to the conventional structure.

Figure 14:
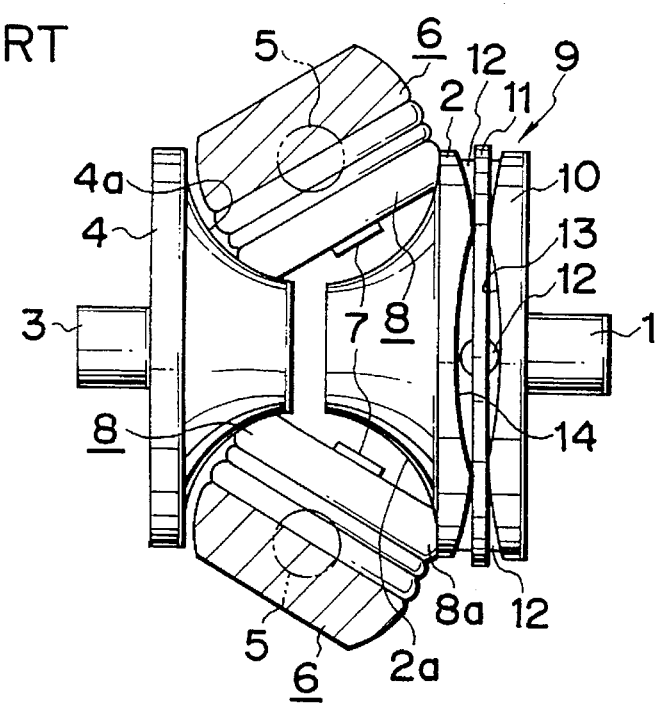
FIG. 14 is a side view showing the basic arrangement of the conventional toroidal type continuously variable transmission in a maximum acceleration state.

When the power rollers 8 are inclined, as shown in FIG. 14, to perform an acceleration between the input- and output-side disks 2 and 4, the thrust load $F_2$ acting from the output-side disk 4 on the output shaft 37 becomes smaller than the thrust load $F_1$ based on the counterforce acting on the cam disk 10 ($F_2<F_1$). In this state, a thrust load $F_1-F_2$ acts on the output shaft 37 to the right in FIG. 1. This thrust load $F_1-F_2$ is received by the smaller, first angular ball bearing 40 of the first and second angular bearings 40 and 41, which constitute the duplex rolling bearing 42.

In this manner, the total of thrust loads acting on the first to third angular ball bearings 40, 41, and 60 in the acceleration state is $F_1+(F_1-F_2)=2F_1-F_2$. In contrast to this, in the conventional structure shown in FIG. 15, the total of thrust loads is $F_1+F_2$. Upon comparison between ($2F_1-F_2$) and ($F_1+F_2$), ($2F_1-F_2$)>($F_1+F_2$) is satisfied only when $F_1>2F_2$. When the toroidal type continuously variable transmission of the present invention is used as a transmission for a vehicle, the acceleration ratio is limited, and $F_1>2F_2$ is almost never satisfied. More specifically, in a normal use state, $F_1<2F_2$, and hence, ($2F_1-F_2$)<($F_1+F_2$). Therefore, in the acceleration state as well, the toroidal type continuously variable transmission of the present invention can reduce the torque loss as compared to the conventional structure in practical applications.

The reason why the second angular ball bearing 41, which receives a thrust load in the deceleration state, of the first and second angular ball bearings 40 and 41 constituting the duplex rolling bearing 42 is designed to be larger than the first angular ball bearing 40 which receives a thrust load in the acceleration state is that a torque input from the engine to the input shaft 32 in the deceleration state is larger than that in the acceleration state.

Figure 2:
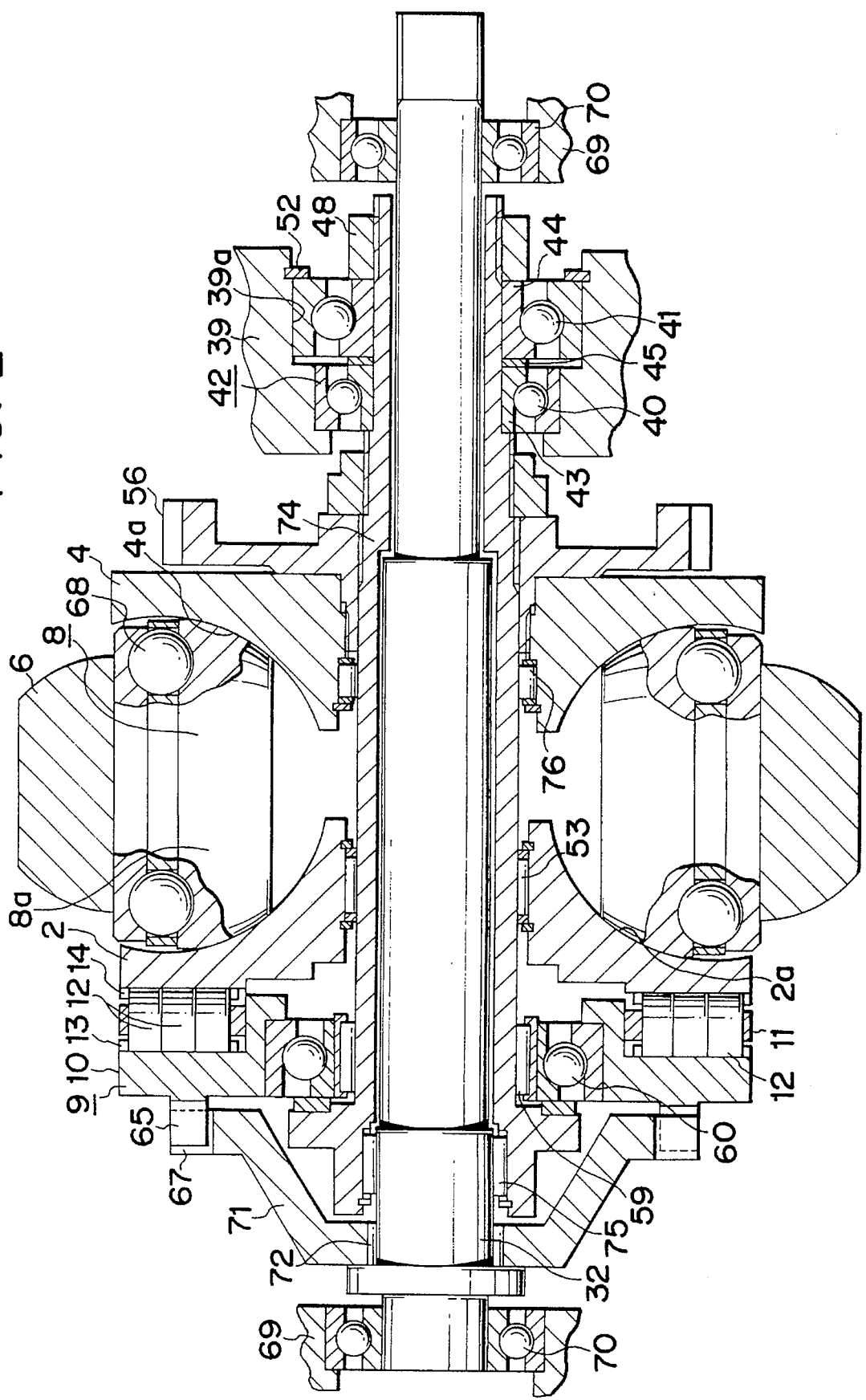
FIG. 2 is a sectional view showing the second embodiment of the present invention.

FIG. 2 shows the second embodiment of the present invention. In this embodiment, the right and left positions of the input- and output-side disks 2 and 4 are reversed to those in the first embodiment. For this reason, the two ends of the input shaft 32 are rotatably supported by support portions 69 arranged in the housing via deep-grooved type ball bearings 70. The inner peripheral edge of a ring-shaped transmission plate 71 is supported by the distal end portion (the left end portion in FIG. 2) of the input shaft 32 via a spline engaging portion 72.

An annular output shaft 74 is arranged around the input shaft 32. A needle bearing 75 is provided between the inner circumferential surface of the distal end portion of the output shaft 74 and the outer circumferential surface of the middle portion, near the distal end, of the input shaft 32. The duplex rolling bearing 42 constituted by the first and second angular ball bearings 40 and 41 is provided between the outer circumferential surface of the proximal end portion of the output shaft 74 and the inner circumferential surface 39a of the second support portion 39 provided to the housing, so as to be able to receive thrust loads in the two directions, which act on the output shaft 74.

The output gear 56 is threadably fixed to the outer circumferential surface of the middle portion of the output shaft 74, and the output-side disk 4 is threadably fixed to the output gear 56. A roller bearing 76 provided between the inner circumferential surface of the output-side disk 4 and the outer circumferential surface of the output shaft 74 receives a radial load acting on the output-side disk 4. In a use state, the output-side disk 4 does not rotate with respect to the output shaft 74.

Since other arrangements and operations are the same as those in the first embodiment, the same reference numerals denote the same parts as in the first embodiment, and a repetitive description thereof will be omitted.

Figure 3:
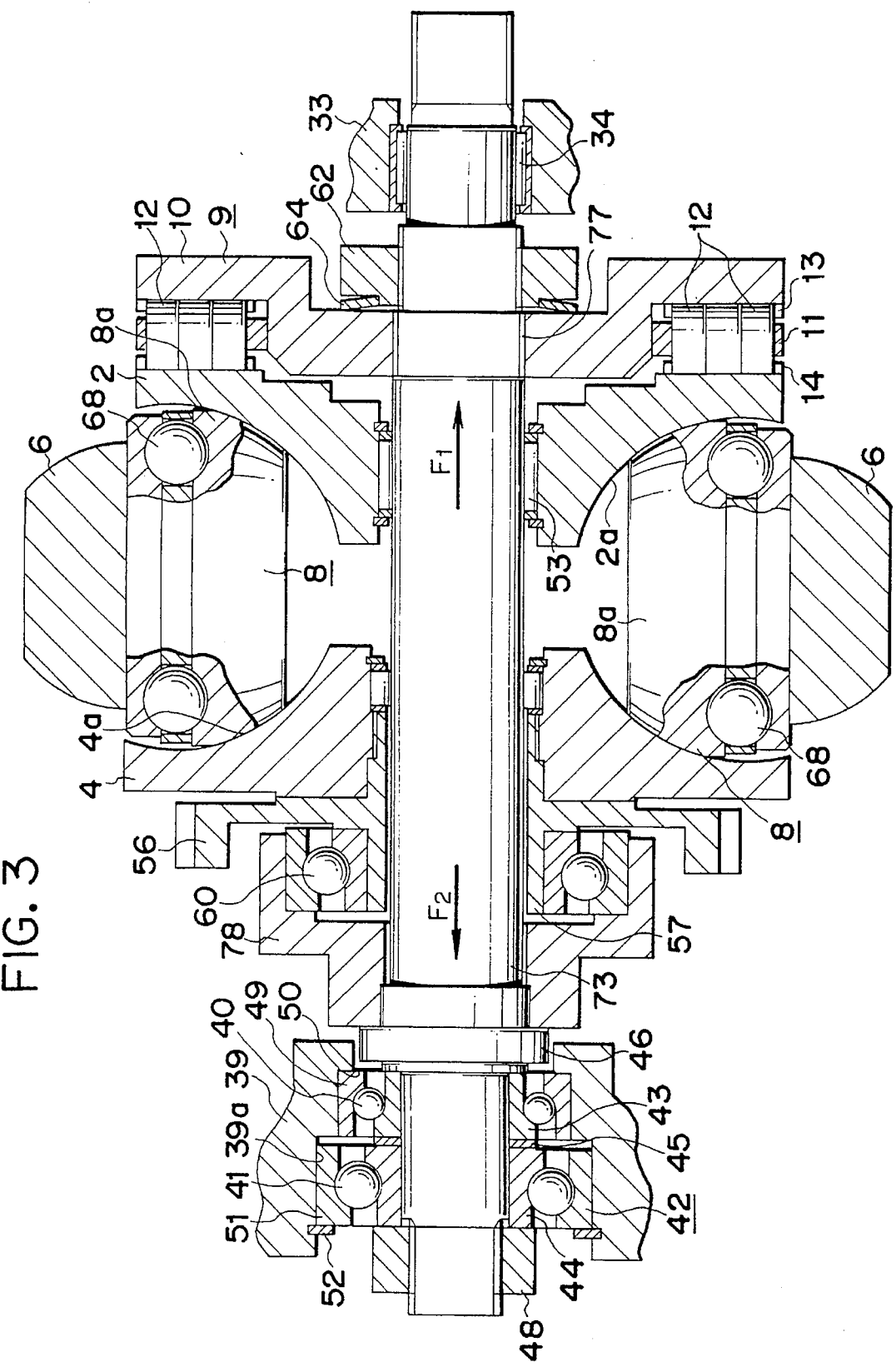
FIG. 3 is a sectional view showing the third embodiment of the present invention.

FIG. 3 shows the third embodiment of the present invention. An input shaft 73 is rotatably supported inside the first support portion 33 provided to the housing via the needle bearing 34. On the other hand, the distal end portion of the input shaft 73 is rotatably supported inside the second support portion 39 provided to the housing via the duplex rolling bearing 42 constituted by the first and second angular ball bearings 40 and 41, so as to be able to receive thrust loads in two directions, which act on the input shaft 73.

The inner peripheral edge of the cam disk 10 constituting the compression device 9 is supported by the middle portion, near the proximal end, of the input shaft 73 via a spline engaging portion 77. The coned disk spring 64 is clamped between the cam disk 10 and the flange nut 62, which is threadably fixed to the input shaft 73.

A holding cylinder 78 is fitted on the middle portion, near the distal end, of the input shaft 73. The boss portion 57 of the output gear 56 as an output member is rotatably supported inside the holding cylinder 78 via the third angular ball bearing 60 as a single rolling bearing.

In this embodiment, when the input shaft 73 is rotated, a thrust load F1 acts on the input shaft 73 to the right in FIG. 3 upon operation of the compression device 9. On the other hand, a thrust load $F_2$ acts on the output-side disk 4 via the input-side disk 2 and the power rollers 8 in a direction opposite to the thrust load $F_1$ upon operation of the compression device 9. This thrust load $F_2$ is received by the third angular ball bearing 60.

Furthermore, the thrust load $F_2$ is transmitted to the input shaft 73 via the holding cylinder 78. Therefore, the thrust loads $F_1$ and $F_2$ in the opposing directions act on the input shaft 73. As a result, a thrust load corresponding to the difference ($|F_1-F_2|$) between the two thrust loads $F_1$ and $F_2$ acts on the input shaft 73 in a direction according to the magnitudes of the two thrust loads.

For example, when the input- and output-side disks 2 and 4 rotate at an equal speed, the thrust loads become equal to each other ($F_1=F_2$), and cancel each other. This state is equivalent to a state wherein no thrust load acts on the input shaft 73. In this state, no thrust load act on the first and second angular ball bearings 40 and 41, and torque losses caused by these angular ball bearings 40 and 41 become very small.

When the power rollers 8 are inclined, as shown in FIG. 13, to perform a deceleration between the input- and output-side disks 2 and 4, the thrust load $F_2$ acting from the output-side disk 4 to the input shaft 73 becomes larger than the thrust load $F_1$ based on the counterforce acting on the cam disk 10 ($F_2>F_1$). In this state, a thrust load $F_2-F_1$ acts on the input shaft 73 to the left in FIG. 3 with respect to the output shaft 37. The thrust load $F_2-F_1$ is received by the larger, second angular ball bearing 41 of the first and second angular ball bearings 40 and 41 constituting the duplex rolling bearing 42.

In this manner, the total of thrust loads acting on the first to third angular ball bearings 40, 41, and 60 in the deceleration state is $F_2+(F_2-F_1)=2F_2F_1$, and torque losses can be reduced as compared to the conventional structure like in the acceleration state in the first embodiment. More specifically, $F_2>F_1$ is satisfied during only a short period of time immediately after a vehicle is started, and torque losses are reduced as a whole.

When the power rollers 8 are inclined, as shown in FIG. 14 to perform an acceleration between the input- and output-side disks 2 and 4, the thrust load $F_2$ becomes smaller than the thrust load $F_1$ ($F_2<F_1$), and a thrust load $F_1-F_2$ acts on the input shaft 73 to the right in FIG. 3. The thrust load $F_1-F_2$ is received by the smaller, first angular ball bearing 40 of the first and second angular ball bearings 40 and 41 constituting the duplex rolling bearing 42.

In this manner, the total of thrust loads acting on the first to third angular ball bearings 40, 41, and 60 in the acceleration state is only $F_2+(F_1-F_2)=F_1$, and torque losses can be reduced as compared to the conventional structure as in the deceleration state in the first embodiment.

Since other arrangements and operations are the same as those in the first embodiment, the same reference numerals denote the same parts as in the first embodiment, and a repetitive description thereof will be omitted.

Figure 4:
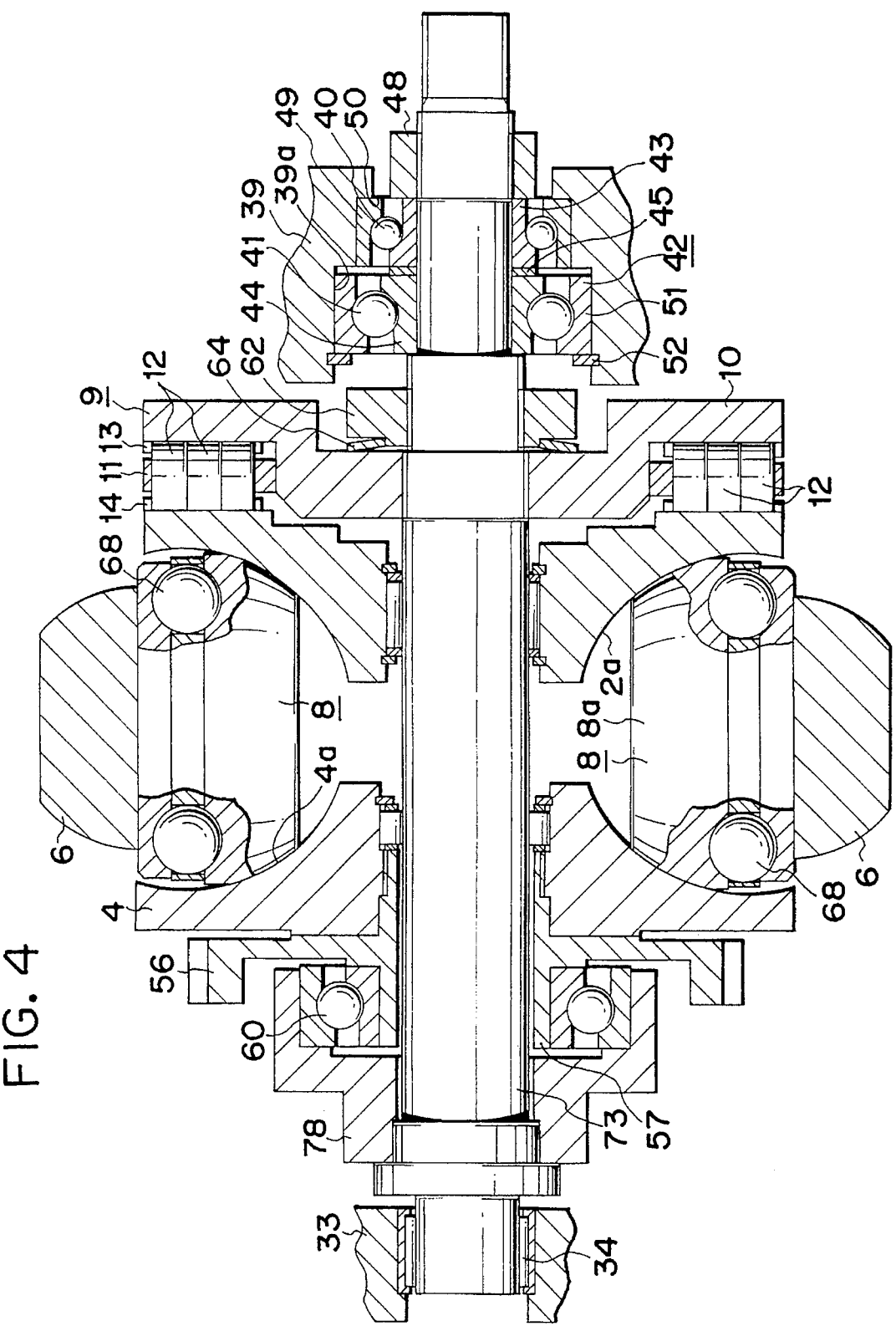
FIG. 4 is a sectional view showing the fourth embodiment of the present invention.

FIG. 4 shows the fourth embodiment of the present invention. In this embodiment, the needle bearing 34 for supporting the input shaft 73 is arranged at the distal end side of the input shaft 73, and the duplex rolling bearing 42 is arranged at the proximal end side thereof, i.e., these bearings are arranged at positions opposite to those in the third embodiment described above. Since other arrangements and operations are the same as those in the third embodiment, the same reference numerals denote the same parts as in the third embodiment, and a repetitive description thereof will be omitted.

Figure 5:
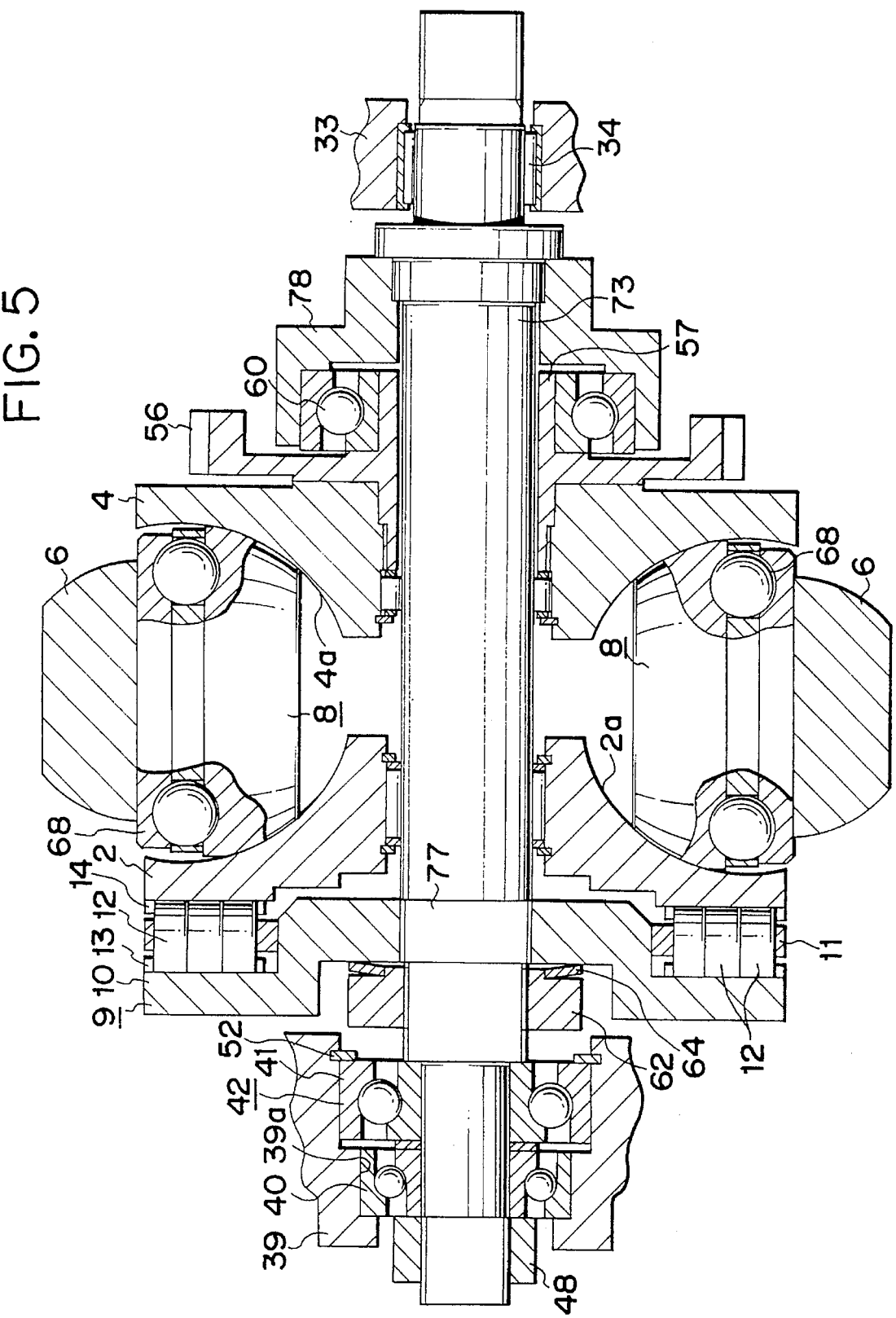
FIG. 5 is a sectional view showing the fifth embodiment of the present invention.

FIG. 5 shows the fifth embodiment of the present invention. In this embodiment, the input-side disk 2 is arranged at the distal end side of the input shaft 73, and the output-side disk 4 is arranged at the proximal end side thereof, i.e., these disks are arranged at positions opposite to those in the third embodiment described above. In correspondence with this arrangement, the arrangement of the first and second angular ball bearings 40 and 41 constituting the duplex rolling bearing 42 is reversed to that in the third embodiment. Since other arrangements and operations are the same as those in the third embodiment, the same reference numerals denote the same parts as in the third embodiment, and a repetitive description thereof will be omitted.

Figure 6:
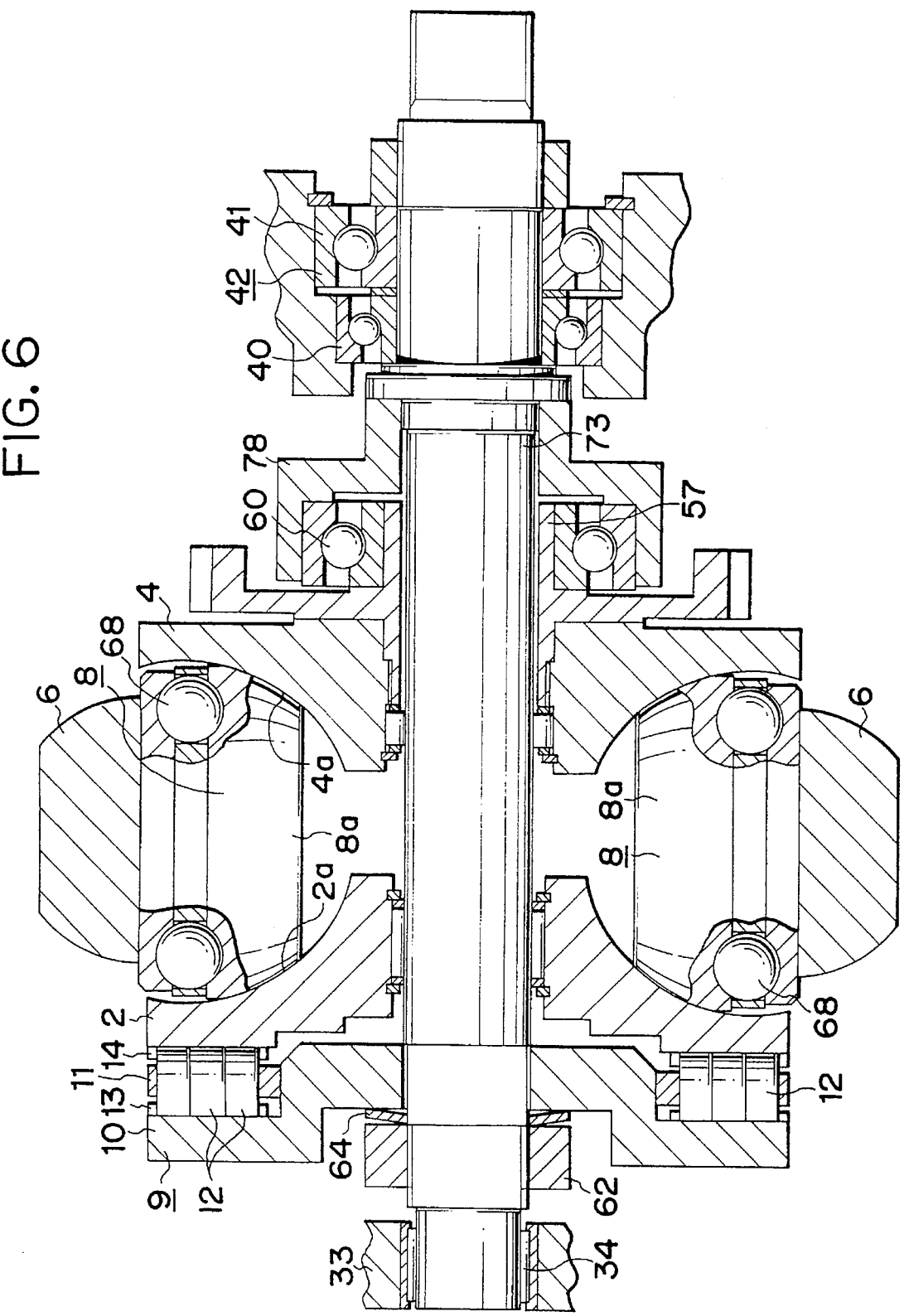
FIG. 6 is a sectional view showing the sixth embodiment of the present invention.
Figure 7:
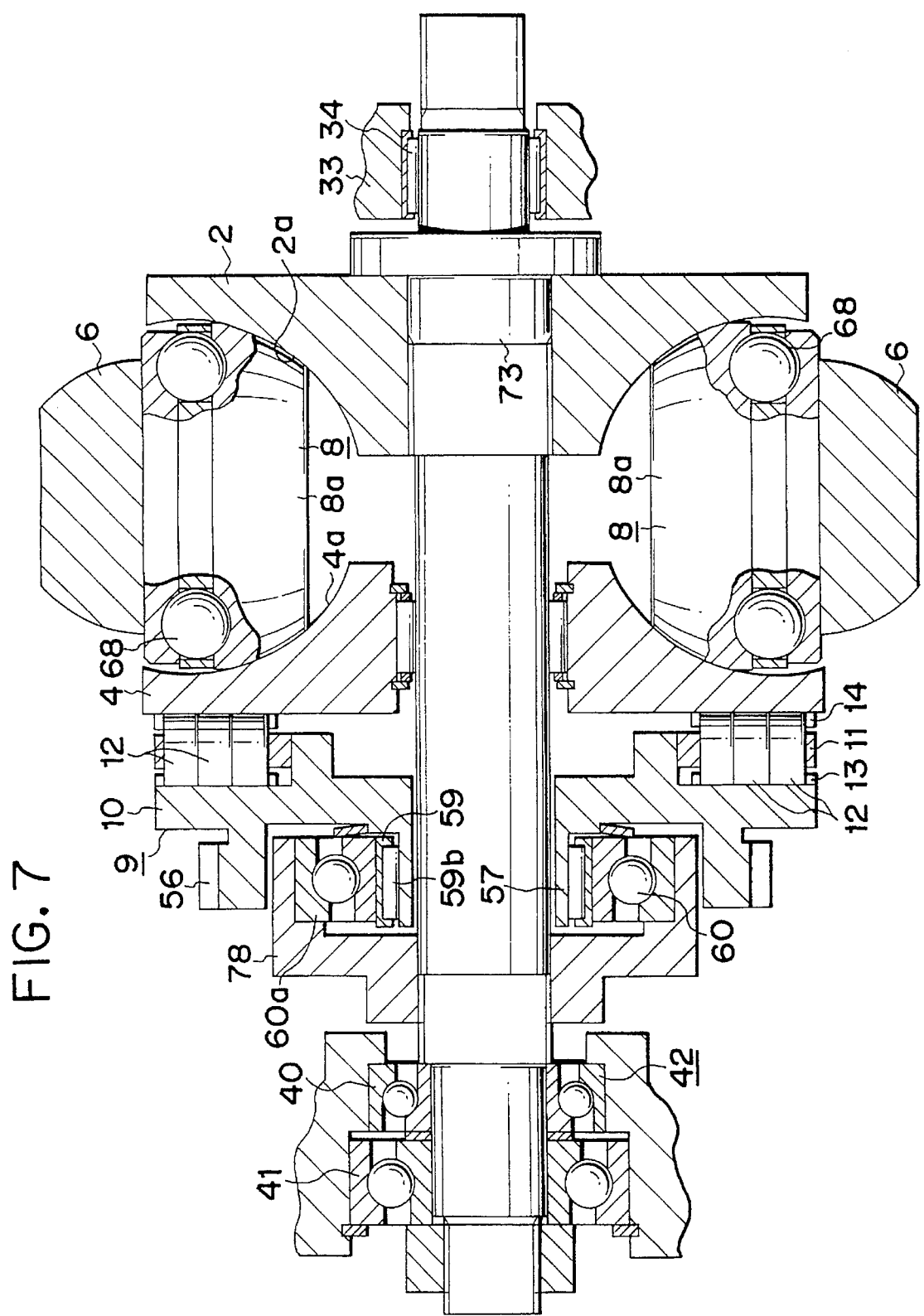
FIG. 7 is a sectional view showing the seventh embodiment of the present invention.
Figure 8:
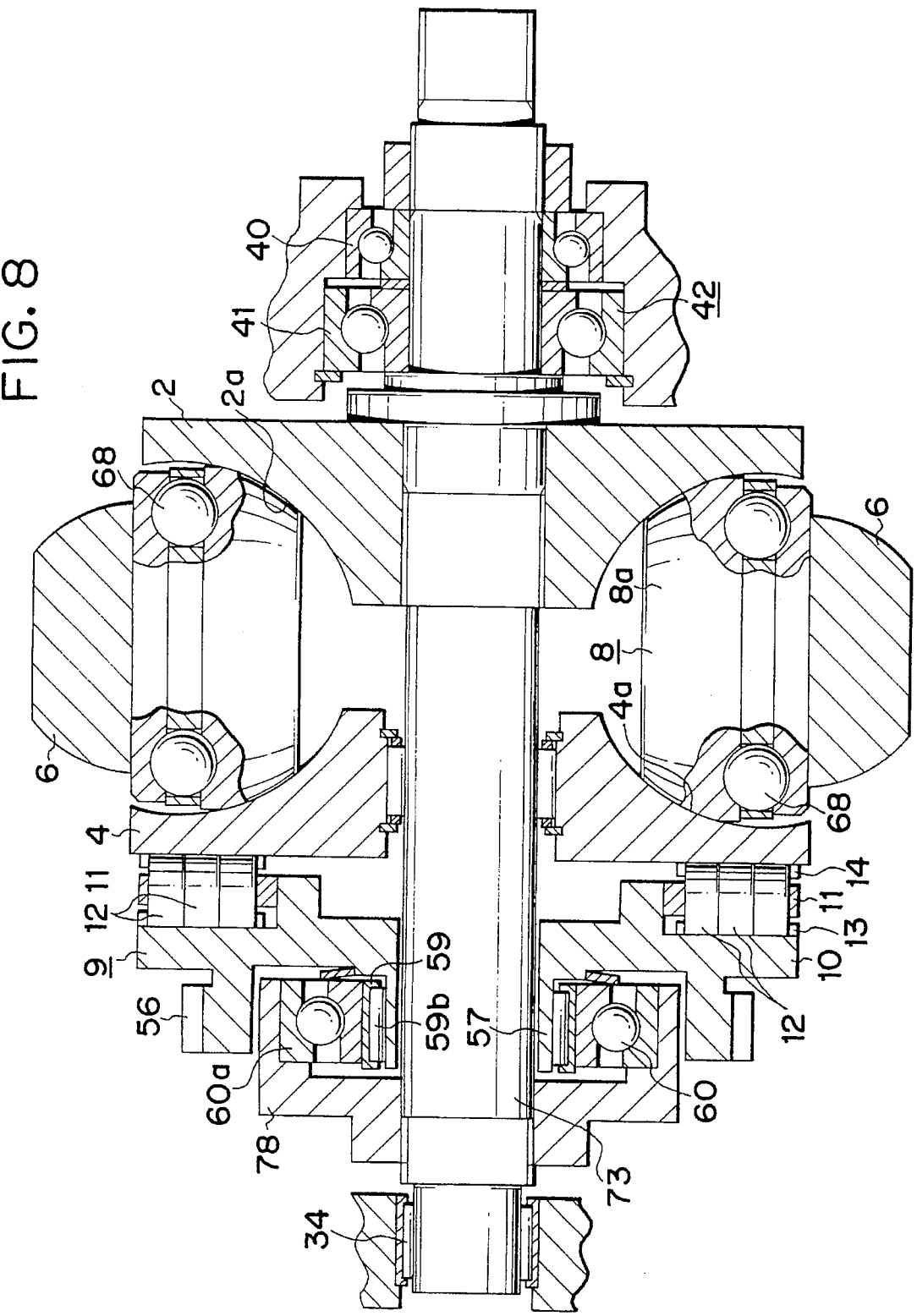
FIG. 8 is a sectional view showing the eighth embodiment of the present invention.
Figure 9:
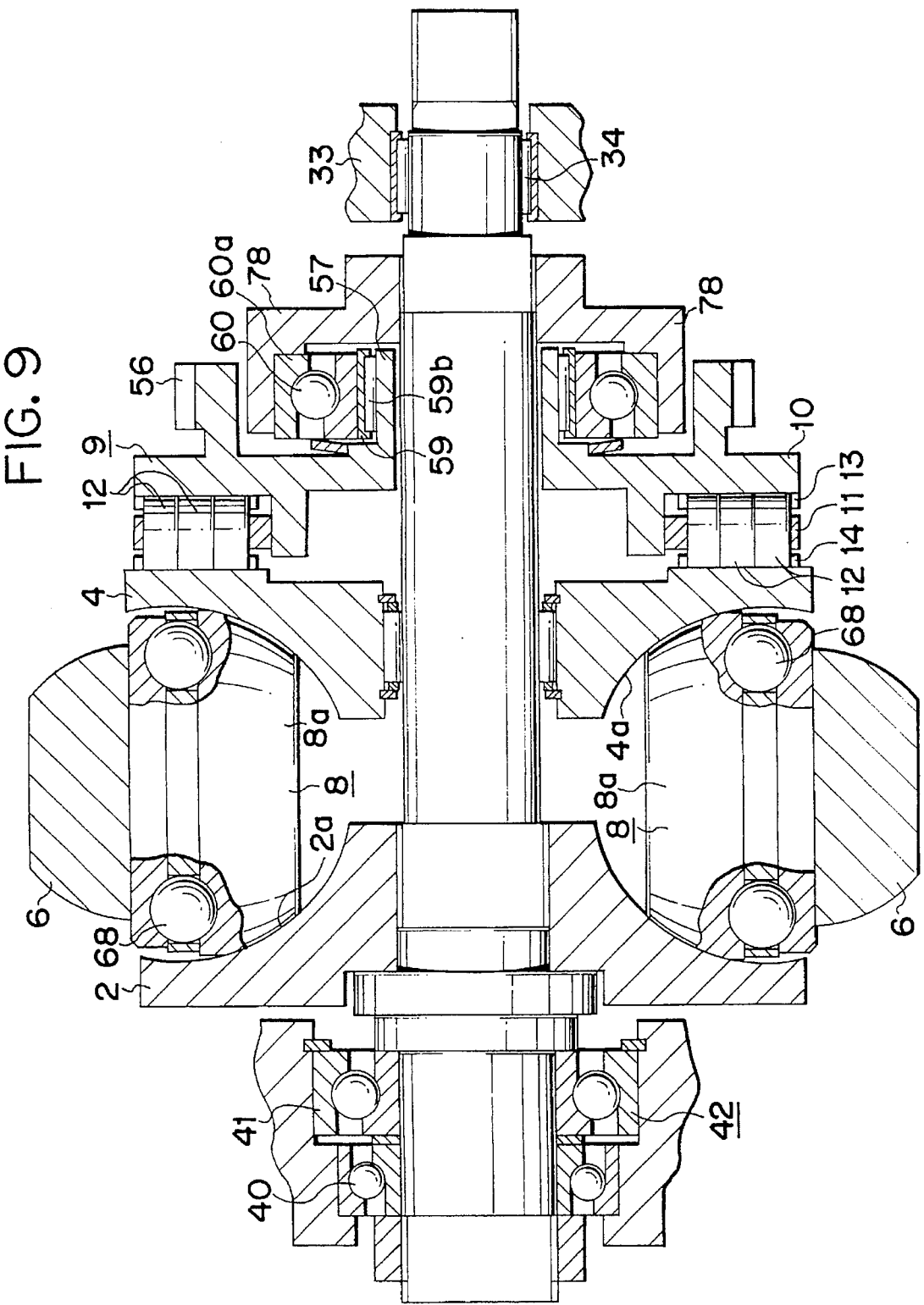
FIG. 9 is a sectional view showing the ninth embodiment of the present invention.
Figure 10:
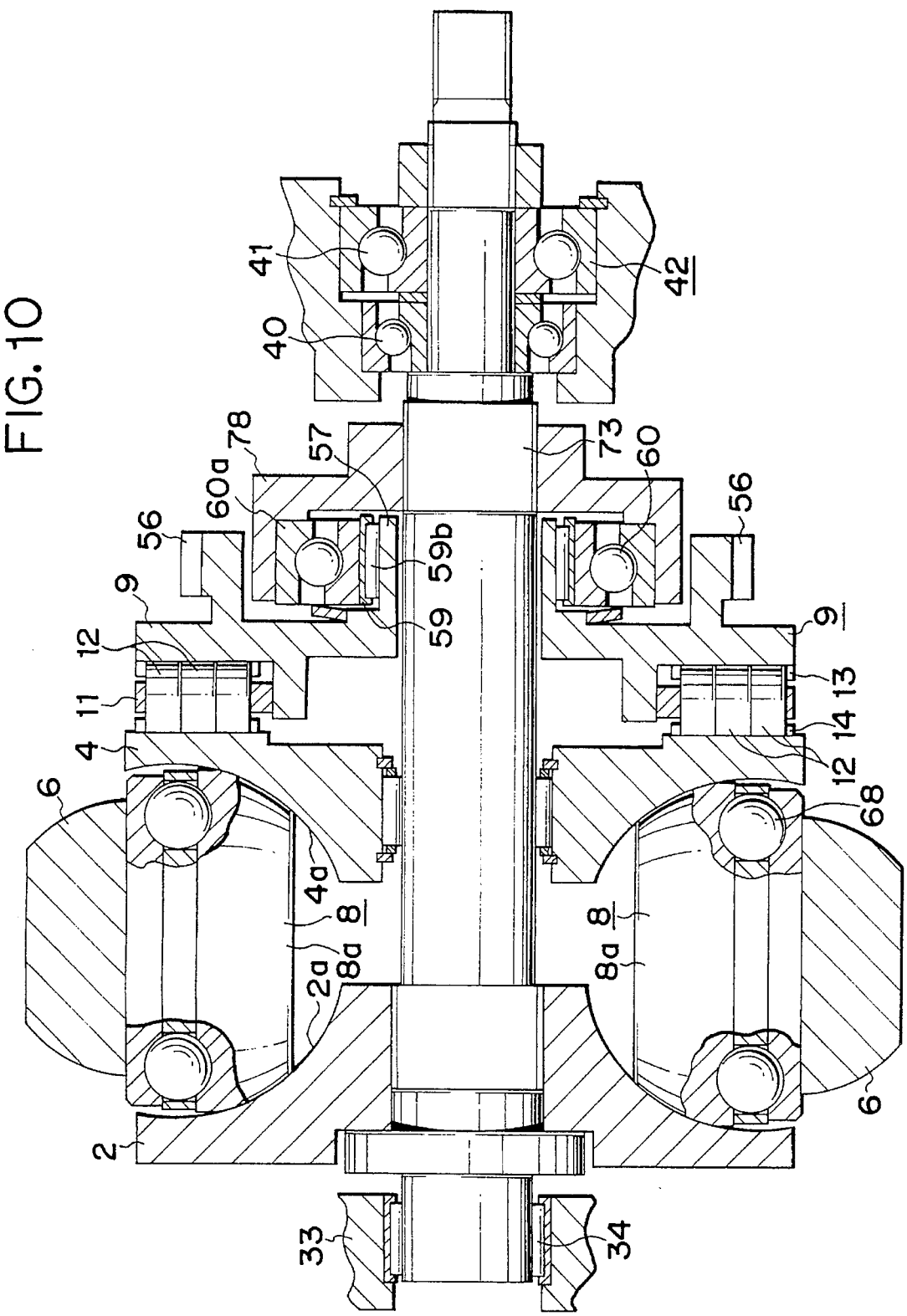
FIG. 10 is a sectional view showing the tenth embodiment of the present invention.

FIG. 6 shows the sixth embodiment of the present invention. In this embodiment, the input-side disk 2 is arranged at the distal end side of the input shaft 73, and the output-side disk 4 is arranged at the proximal end side thereof, i.e., these disks are arranged at positions opposite to those in the fourth embodiment. In correspondence with this arrangement, the arrangement of the first and second angular ball bearings 40 and 41 constituting the duplex rolling bearing 42 is reversed to that in the fourth embodiment. Since other arrangements and operations are the same as those in the fourth embodiment, the same reference numerals denote the same parts as in the fourth embodiment, and a repetitive description thereof will be omitted.

FIGS. 7 to 10 show the seventh to tenth embodiments of the present invention. In each of these embodiments, the compression device 9 is provided between the outer surface of the output-side disk 4 and the output gear 56 as an output member. Therefore, one cam surface 14 constituting the compression device 9 is formed on the side surface of the output gear 56. Other arrangements and operations of these embodiments are respectively the same as those in the third to sixth embodiments. The same reference numerals denote the same parts, and a repetitive description thereof will be omitted.

Figure 11:
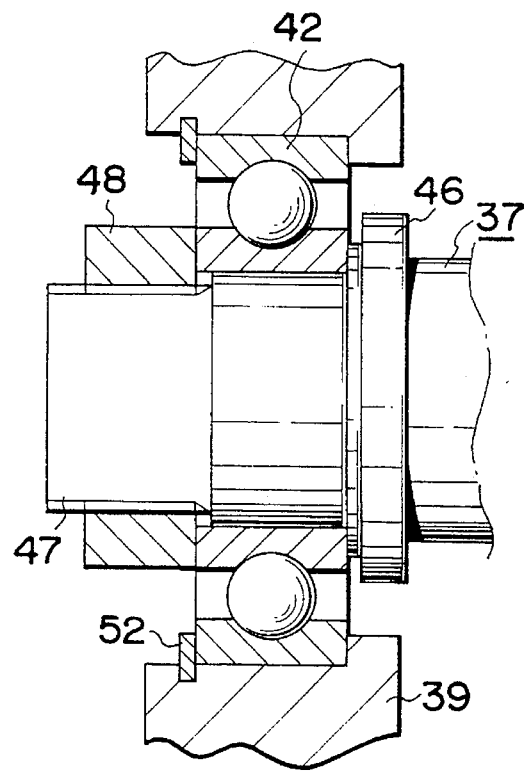
FIG. 11 is a sectional view showing the first example of a duplex rolling bearing in correspondence with a portion A in FIG. 1.
Figure 12:
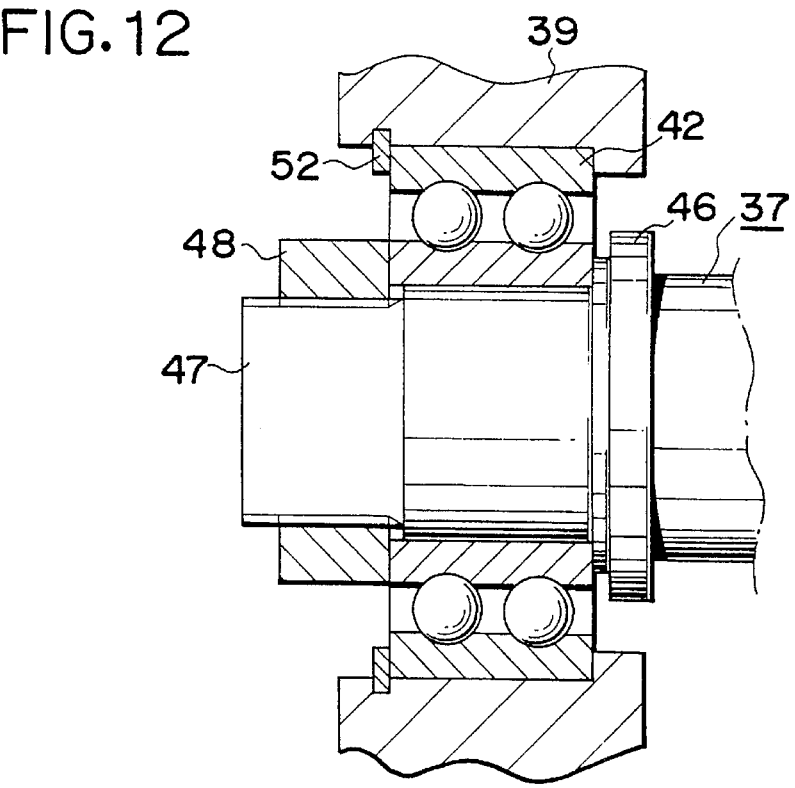
FIG. 12 is a sectional view showing the second example of a duplex rolling bearing in correspondence with a portion A in FIG. 1.

In each of the above-mentioned embodiments, a combination of the first and second angular ball bearings 40 and 41 is used as the duplex rolling bearing 42 for receiving thrust loads in two directions, which act on the output shaft 37 (in the first and second embodiments) or the input shaft 73 (in the third to tenth embodiments). As the duplex rolling bearing 42, a single-raceway deep-grooved type ball bearing (FIG. 11) or a double-raceway deep-grooved type ball bearing (FIG. 12) may be used.

Since the toroidal type continuously variable transmission according to the present invention has the above-mentioned arrangement and operation, a toroidal type continuously variable transmission with high efficiency can be provided by suppressing torque losses based on thrust loads generated upon operation of the transmission.

Since the toroidal type continuously variable transmission according to the present invention has the above-mentioned arrangement and operation, the mechanical strength of a portion for transmitting a thrust load from the output-side disk to the output shaft can be improved, and durability and reliability of this portion can be improved.

In FIGS. 7 to 10, the output gear 56 as an output member is integrally formed on the outer surface of the cam disk 10. The outer ring 60a of the third angular ball bearing 60 is fitted in a holding ring 78 fixed to the outer circumferential surface of the middle portion of the output shaft 37, and the needles 59b of the needle bearing 59 contact the outer circumferential surface of the cylindrical portion 57 formed on the output gear 56.

In a use of the toroidal type continuously variable transmission, when the cam disk 10 is displaced upon operation of the compression device 9, the needles 59b are displaced in the spiral direction on the outer circumferential surface of the cylindrical portion 57. Therefore, in each of these embodiments, a frictional loss upon displacement of the cam disk 10 can be suppressed.

Since the toroidal type continuously variable transmission according to the present invention has the above-mentioned arrangement and operation, a toroidal type continuously variable transmission with high efficiency can be provided by suppressing a frictional loss generated upon operation of the transmission.

What is claimed is:

1. A toroidal type continuously variable transmission, which comprises an input member, an input-side disk arranged concentrically with said input member and rotated upon rotation of said input member, an output-side disk arranged concentrically with said input-side disk and supported to be rotatable with respect to said input-side disk, an output member arranged concentrically with said output-side disk and rotated upon rotation of said output-side disk, a compression device for pressing one of said input- and output-side disks toward the other disk upon operation of said transmission, trunnions which are swung about pivot shafts located at twisted positions with respect to a central axis of said input- and output-side disks, and power rollers clamped between said input- and output-side disks while being rotatably supported by said trunnions, and in which opposing surfaces of said input- and output-side disks are formed to have an arcuate recessed surface section, circumferential surfaces of said power rollers are formed to have a spherical projecting surface, and the circumferential surfaces and the opposing surfaces contact each other, said transmission further comprising: a single rolling bearing which is arranged between one of said input and output members and one of said input- and output-side disks, allows full circumferential relative rotation between said one disk and said one member while said input-and output-side disks are driven, and supports a thrust load acting on said one disk upon operation of said compression device; and a duplex rolling bearing which is arranged between said one member and a stationary portion, allows rotation of said one member with respect to said stationary portion, and supports thrust loads in two directions acting on said one member.

2. A transmission according to claim 1, wherein said single rolling bearing is arranged between said one member and said output-side disk.

3. A transmission according to claim 1, wherein said single rolling bearing is arranged between said one member and said input-side disk.

4. A toroidal type continuously variable transmission comprising: input and output shafts which are concentrically arranged and independently rotatable; an input-side disk arranged concentrically with said input shaft and rotated upon rotation of said input shaft; an output-side disk which is supported around said output shaft not to be rotatable with respect to said output shaft; an output gear which is arranged independently from said output-side disk and supported around said output shaft not to be rotatable with respect to said output shaft; a compression device for pressing one of said input- and output-side disks toward the other disk upon operation of said transmission; a rolling bearing arranged between said output shaft and a stationary portion for receiving a thrust load acting from said output-side disk to said output shaft upon operation of said compression device; trunnions which are swung about pivot shafts located at twisted positions with respect to a central axis of said input- and output-side disks; and power rollers clamped between said input- and output-side disks while being rotatably supported by said trunnions wherein a boss portion formed on an inner circumferential portion of said output gear is clamped between a collar portion integrally formed on an outer circumferential surface of an intermediate portion of said output shaft and a portion near an inner periphery of an outer surface of said output-side disk, opposing surfaces of said input- and output-side disks are formed to have an arcuate recessed surface section, circumferential surfaces of said power rollers are formed to have a spherical projecting surface, and the circumferential surfaces and the opposing surfaces contact each other.

5. A toroidal type continuously variable transmission comprising: an input member; an input-side disk arranged concentrically with said input member and rotated upon rotation of said input member; an output-side disk arranged concentrically with said input-side disk and rotatably supported to oppose said input-side disk; an output member arranged concentrically with said output-side disk and rotated upon rotation of said output-side disk; a compression device for pressing one of said input- and output-side disks toward the other disk upon operation of said transmission; a first rolling bearing which has an outer ring coupled to an inner peripheral edge of a cam disk of said compression device, and receives a thrust load acting on said cam disk upon operation of said compression device; a second rolling bearing which is arranged between an inner circumferential surface of an inner ring of said first rolling bearing and an outer circumferential surface of one of said input and output members, which one member is rotated together with said other disk and is displaceable in a thrust direction; trunnions which are swung about pivot shafts located at twisted positions with respect to a central axis of said input- and output-side disks; and power rollers clamped between said input- and output-side disks while being rotatably supported by said trunnions, wherein opposing surfaces of said input- and output-side disks are formed to have an arcuate recessed surface section, circumferential surfaces of said power rollers are formed to have a spherical projecting surface, and the circumferential surfaces and the opposing surfaces contact each other.

6. A toroidal type continuously variable transmission, which comprises an input member, an input-side disk arranged concentrically with said input member and rotated upon rotation of said input member, an output-side disk arranged concentrically with said input-side disk and supported to be rotatable with respect to said input-side disk, an output member arranged concentrically with said output-side disk and rotated upon rotation of said output-side disk, a compression device for pressing one of said input- and output-side disks toward the other disk upon operation of said transmission, trunnions which are swung about pivot shafts located at twisted positions with respect to a central axis of said input- and output-side disks, and power rollers clamped between said input- and output-side disks while being rotatably supported by said trunnions, and in which opposing surfaces of said input- and output-side disks are formed to have an arcuate recessed surface section, circumferential surfaces of said power rollers are formed to have a spherical projecting surface, and the circumferential surfaces and the opposing surfaces contact each other, said transmission further comprising: a single rolling bearing which is arranged between one of said input and output members and one of said input- and output-side disks, allows full circumferential relative rotation between said one disk and said one member while said input- and output-side disks are driven, and supports a thrust load acting on said one disk upon operation of said compression device; and rolling bearing means which is arranged between said one member and a stationary portion, allows rotation of said one member with respect to said stationary portion, and supports thrust loads in two directions acting on said one member.

7. A transmission according to claim 6, wherein said single rolling bearing is arranged between said one member and said output-side disk.

8. A transmission according to claim 6, wherein said single rolling bearing is arranged between said one member and said input-side disk.

* * * * *